United States Patent [19]
Braun

[11] 3,891,042
[45] June 24, 1975

[54] CONTROL ARRANGEMENT FOR A HYDRAULICALLY POWERED VEHICLE

[76] Inventor: Gerald W. Braun, Rt. 1, Avilla, Ind. 46710

[22] Filed: Jan. 21, 1974

[21] Appl. No.: 435,279

[52] U.S. Cl............ 180/6.48; 74/471 XY; 180/77 H
[51] Int. Cl............................................. B62d 11/04
[58] Field of Search..... 180/6.48, 77 H; 74/471 XY, 74/471 R, 469

[56] References Cited
UNITED STATES PATENTS

| | | | |
|---|---|---|---|
| 2,941,609 | 6/1960 | Bowers et al. | 180/6.48 |
| 3,528,519 | 9/1970 | Case | 180/6.48 |
| 3,540,220 | 11/1970 | Lauck | 180/6.48 |
| 3,541,877 | 11/1970 | Houk | 180/6.48 X |
| 3,550,708 | 12/1970 | Paramythioti | 180/6.48 |
| 3,592,280 | 7/1971 | Wappler | 180/6.2 |
| 3,613,817 | 10/1971 | Glass | 180/6.48 |
| 3,620,096 | 11/1971 | Scolari | 180/6.48 X |

*Primary Examiner*—David Schonberg
*Assistant Examiner*—John A. Pekar
*Attorney, Agent, or Firm*—Albert L. Jeffers; Roger M. Rickert

[57] ABSTRACT

A single lever steering assembly for a hydraulically driven vehicle is disclosed in several variations comprising a control lever exhibiting at least 2 degrees of mechanical freedom in response to actuation by the operator, first and second hydraulic control arms for individual ones of the vehicle drive motors movable in a continuous manner between full ahead and full reverse positions, a control plate pivotably supported on the vehicle and having 2 degrees of mechanical freedom, and means coupling the control lever and the first and second arms to distinct points on the control plate so as to provide single lever operator control for both speed and direction.

9 Claims, 8 Drawing Figures

PATENTED JUN 24 1975

3,891,042

SHEET 1

PATENTED JUN 24 1975  3,891,042
SHEET 2
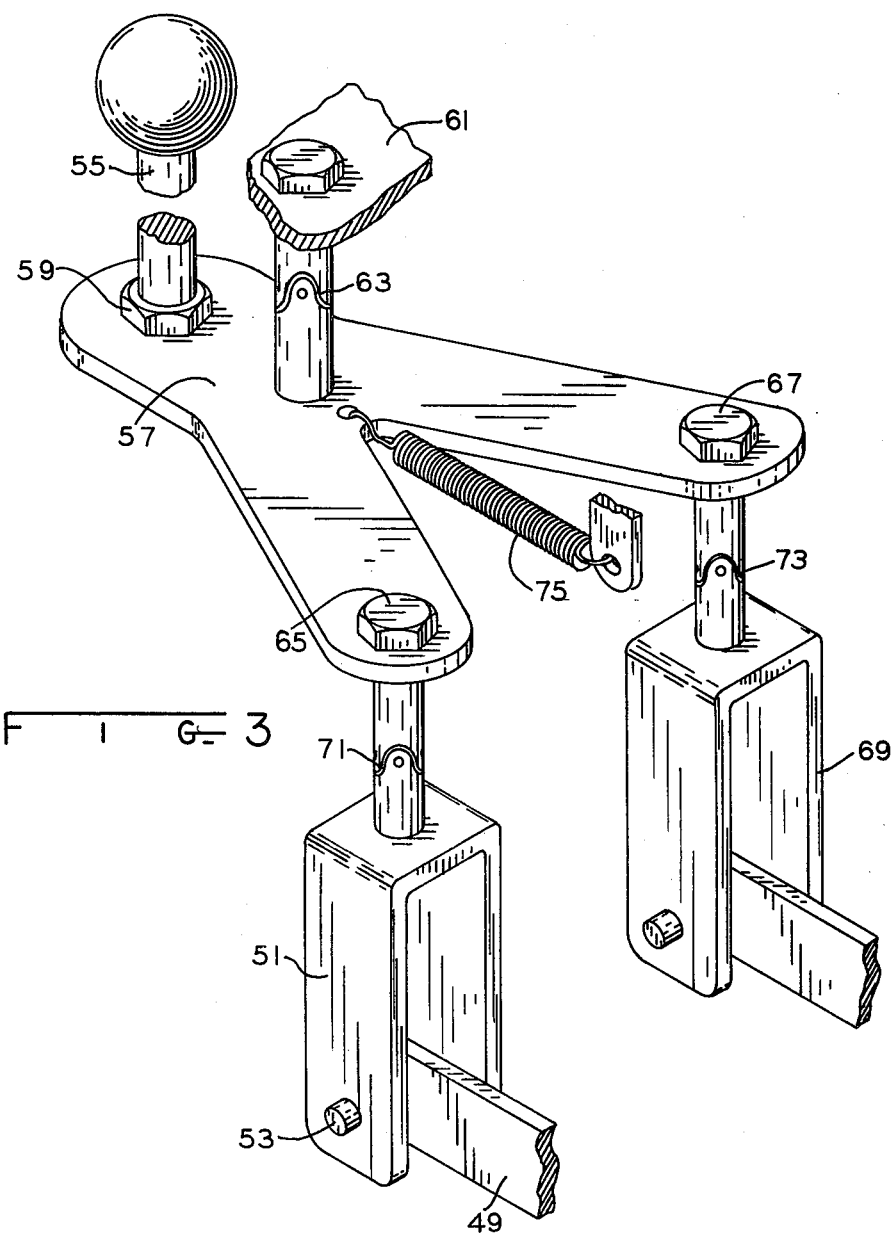
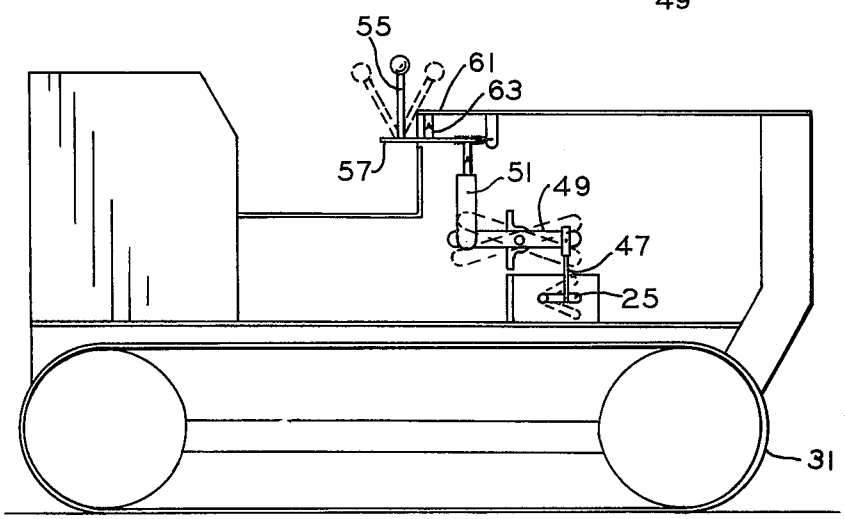

CONTROL ARRANGEMENT FOR A HYDRAULICALLY POWERED VEHICLE

BACKGROUND OF THE INVENTION

The present invention relates to a control mechanism for a hydraulically powered utility vehicle of the general type disclosed in U.S. Pat. No. 3,645,349. While vehicles such as that illustrated by this patent are extremely useful and versatile, the control arrangement has certain defects. The tracks have individual hydraulic motors and the rate and direction of hydraulic flow to these individual motors is individually controllable by operator actuable levers. Thus, to move forward in a straight line, the operator must push forward on the two control levers simultaneously while to, for example, turn to the right in the minimum possible distance, the operator must push the left control lever forward while bringing the right control lever back into its reverse drive position. Thus, while the vehicle is moving or changing speed or direction, the operator has both hands occupied and may control accessories such as a hydraulically actuated bucket only with great difficulty.

It is therefore an object of the present invention to provide a single lever operator control for both speed and direction of a vehicle.

Another object of the present invention is to provide an improved control arrangement for hydraulically powered utility vehicles.

A further object of the present invention is to free one hand of a utility vehicle operator for accessory operation while the vehicle is in motion.

A still further object of the present invention is to provide control means in accordance with one or more of the foregoing objects having additional vehicle control capabilities associated therewith.

SUMMARY OF THE INVENTION

The foregoing as well as numerous other objects and advantages of the present invention are achieved by providing a hydraulically powered utility vehicle having first and second hydraulic motors permanently connected to drive laterally separated ground engaging locomotion producing means such as a track laying arrangement; and having a primary energy source such as a gasoline engine, driving pumps individual to the pair of motors with each pump having a hydraulic control arm continuously movable between full ahead and full reverse positions. The two control arms and an operator actuable control lever are connected to a control plate supported by a universal joint from the vehicle frame thus allowing one-handed operation of the vehicle.

The subject matter which I regard as my invention is particularly pointed out and distinctly claimed in the concluding portion of this specification. My invention itself, however, together with further objects and advantages thereof may best be understood by reference to the following description taken in conjunction with the accompanying drawing.

BRIEF DESCRIPTION OF THE DRAWING

FIG. 2 is a side view of such a utility vehicle illustrating the control arrangement according to one aspect of the present invention;

FIG. 3 is a perspective view of part of the control lever linkage arrangement of FIG. 2;

DESCRIPTION OF THE PREFERRED EMBODIMENT

Figure 1:
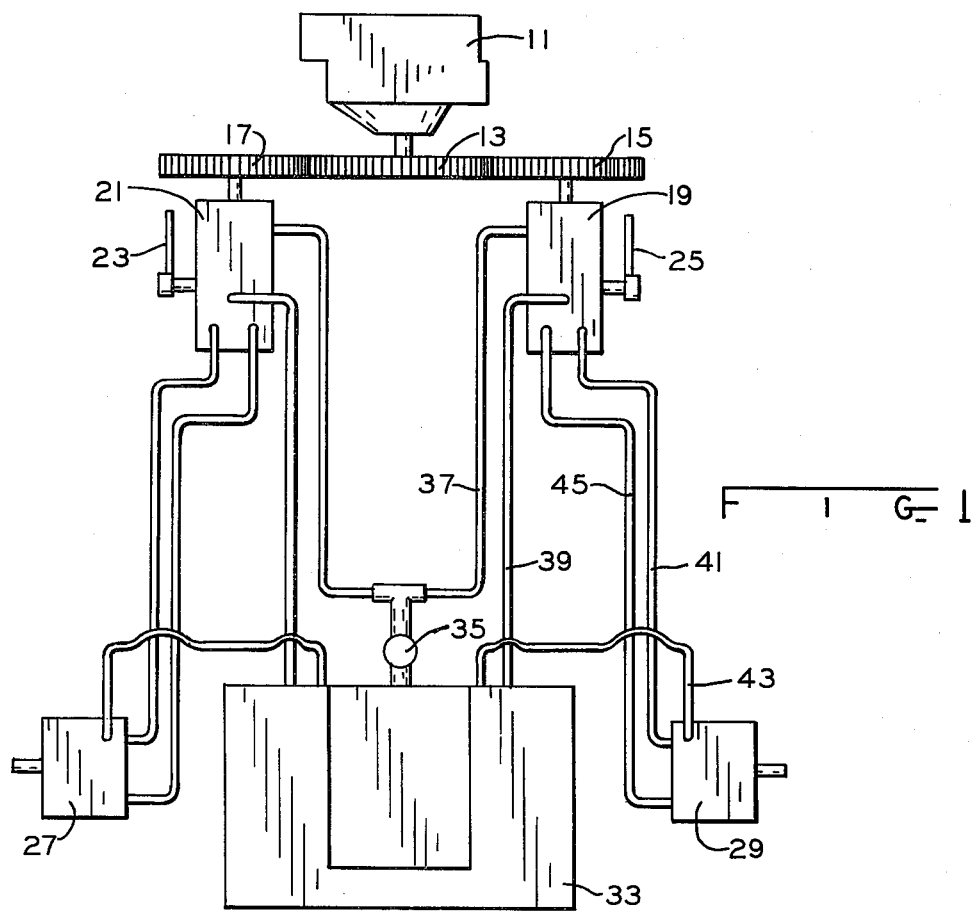
FIG. 1 is a partially schematic diagram of the power drive arrangement for a hydraulically powered utility vehicle employing the present invention.

Considering FIGS. 1 and 2 together, many features of the overall machine of the present invention are similar to features of the aforementioned patent. A primary energy source such as a gasoline engine 11 drives by way of gears 13, 15 and 17 a pair of hydraulic pumps 19 and 21 which may, for example, be variable displacement hydraulic piston pumps. Each pump has a hydraulic control arm 23 or 25 which is pivotably mounted on the pump and controls the rate and direction of hydraulic flow from the pump in a continuous manner between full flow in one direction and full flow in a reverse direction. Each control arm, of course, controls the flow to an individual one of the hydraulic motors 27 and 29 which motors are permanently connected to drive laterally separated ground engaging locomotion producing means such as the track 31 in a manner, for example, as taught in the aforementioned patent.

As in the aforementioned patent, a hydraulic fluid reservoir such as the seat tank 33 is provided. Oil from the reservoir passes through an oil filter 35 and by way of line 37 into the pump 19. If the control arm 25 is in its neutral position the pump 19 merely forces the fluid back through a case drain line 39 into the reservoir. If the control arm 25 is in its forward position, the pump 19 then supplies fluid by way of line 41 to the motor 29 and from there the fluid returns to the reservoir by way of a case drain line 43. If the control arm 25 is switched to its reverse position, the pump 19 then supplies fluid to the motor 29 by way of line 45 causing the motor to run in reverse direction. Again, the fluid is returned to the reservoir 33 by way of the case drain line 43. Pump 21 and motor 27 are connected in a similar manner.

Considering now FIGS. 2 and 3 together, control arm 25 has a first linkage 47 coupling it to a pivoting link 49 the other end of which is attached to a clevis-like coupling member 51 by a pin 53. The operator control lever 55 is coupled to a control plate 57, for example, by a pair of nuts such as 59 and the control plate 57 is in turn supported from a portion of the vehicle 61 by a universal joint 63 which pivotably supports the plate and provides 2 degrees of freedom for the lever and plate. The control plate could assume many configurations other than that shown so long as the plate provides distinct points such as 65 and 67 to which the clevis 51 and the corresponding clevis 69 may be attached, for example, by further universal joints 71 and 73. Depending on tolerances and linkage lengths, it may be desirable to provide laterally extended slots at 65 and 67 of the control plate to allow for the lateral movement of the plate relative to the pivoting links 49 when the control lever moves left and right. Spring biasing means 75 may be provided to return the control arrangement to a neutral position when the operator releases the control lever 55.

Figure 4:
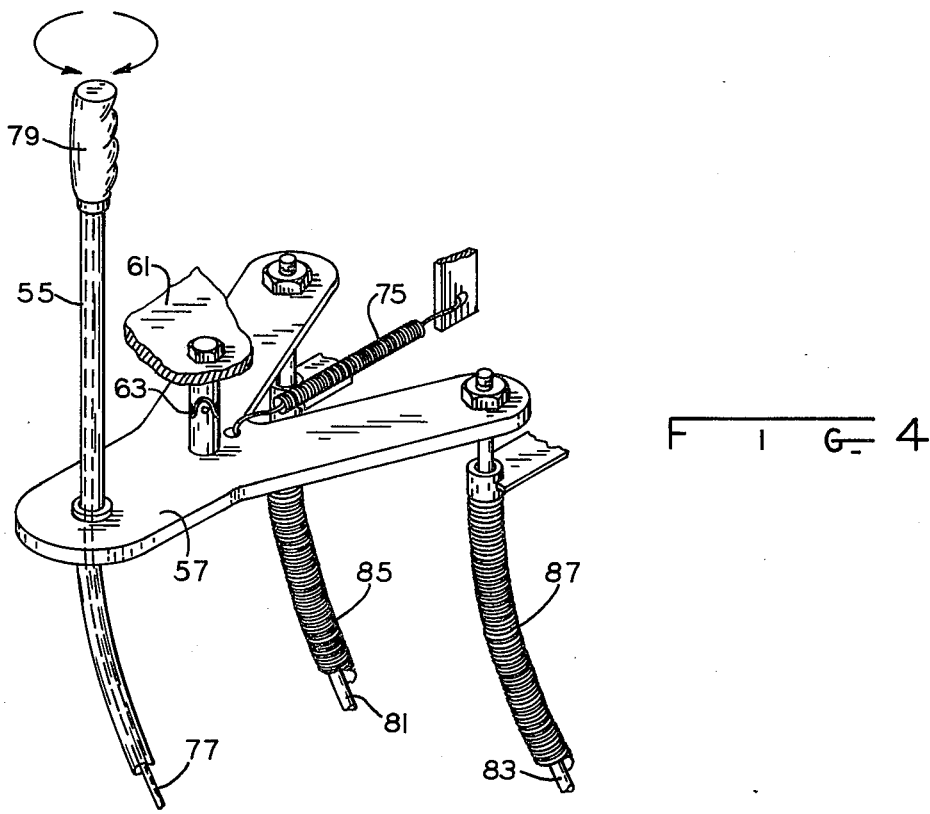
FIG. 4 is a perspective view of a control lever arrangement illustrating possible variations to the arrangement of FIG. 3.

FIG. 4 illustrates a variation on the mechanism of FIG. 3 with like parts bearing the same reference numerals. The control lever 55 is solidly attached to the control plate 57 but is hollow to allow a flexible control cable 77 to pass therethrough and be connected at one end to a rotatable control knob 79. The other end of the cable 77 may, for example, be attached to a throttle arrangement on the engine 11 for controlling the engine speed. Thus, the control arrangement of FIG. 4 has, in addition to the 2 degrees of freedom illustrated by the mechanism of FIG. 3, a 3rd degree of freedom allowing the portion of the lever to experience a twisting movement for controlling the primary energy source. The arrangement of FIG. 4 also differs from that discussed previously in that flexible cables 81 and 83 slidable within coiled sheaths 85 and 87, which are fixed to the framework at their opposite ends in known manner, function as the means for coupling the control plate to the individual control arms. It is, of course, possible to employ only some of the features of FIG. 4 in the arrangement of FIG. 3.

Figure 5:
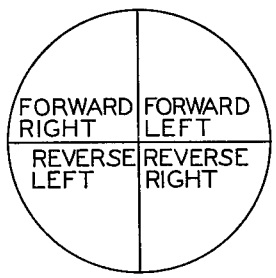
FIG. 5 is a diagram illustrating the response characteristics of a vehicle employing the control units of FIGS. 3 or 4.

The arrangements of FIGS. 3 and 4 give a control pattern as depicted in FIG. 5. When the control lever is forced directly forward the vehicle moves in a forward direction without turning and when the control lever is moved in a directly rearward direction the vehicle moves in a straight line to the rear. With the control lever in its rearward position, slight movement of that control lever toward the right will raise the clevis 69 an additional amount, thus driving the left track faster causing the machine to execute a turn to the right. When the control lever is in its full forward position and then displaced toward the right clevis 51 is pushed downward an additional amount, thus driving the right hand track faster causing the machine to turn toward the left. This mirror image steering in the forward direction may, of course, be changed simply by reversing, for example, the pumps to which control cables 81 and 83 are connected or by changing the hydraulic connections in FIG. 1. Either of these expedients will, however, result in a mirror image steering situation when the machine is being backed up. An operator will soon accommodate to this steering anomaly in most situations, however, the steering pattern may be made more "natural" by the structure illustrated in FIGS. 6 and 7.

Figure 6:
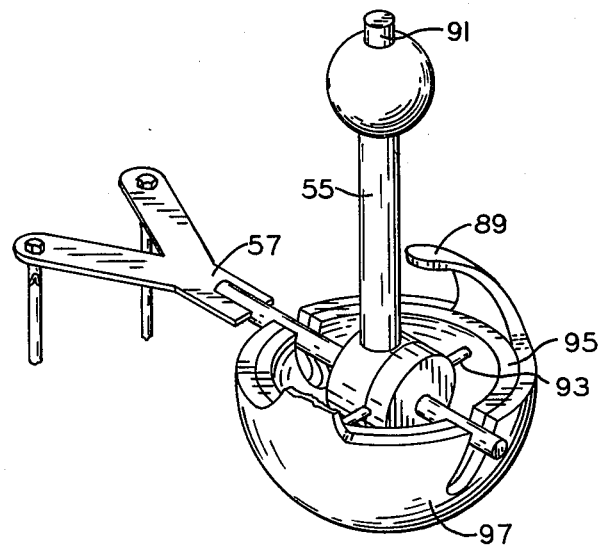
FIG. 6 illustrates in partially broken away perspective a control arrangement which partially reverses the control pattern illustrated in FIG. 5.
Figure 7:
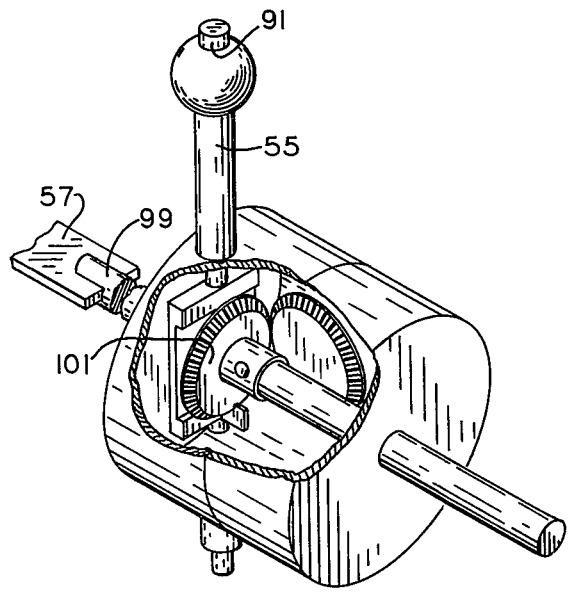
FIG. 7 illustrates in partially broken away perspective the differential gear and locking features of the control arrangement of FIG. 6.
Figure 8:
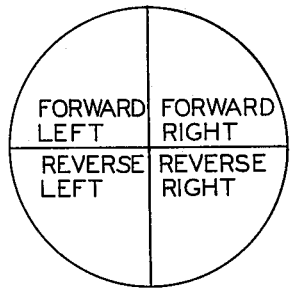
FIG. 8 is a diagram illustrating the response characteristics of a vehicle employing the control unit of FIGS. 6 and 7.

In the previously discussed control systems, there was a rigid connection between the control lever and the control plate, however, in FIGS. 6 and 7 this rigid connection remains only for forward control lever positions and in reverse control lever positions a differential gearing arrangement functions to connect the control lever and control plate to reverse the left-right movements thereof. In FIG. 6, a pair of barrier bars such as 89 prevent the control lever from being moved between forward and reverse positions unless the control lever is in a neutral position. In that neutral position a locking rod 91 may be depressed to allow the control lever to operate in the reverse differentially coupled region. For forward and reverse movements, the control lever 55 and control plate 57 pivot about the rod 93 in a straightforward manner and for the forward positions left and right motion of the control lever 55 causes the ball 95 to which the rod 93 is attached to move in a similar left and right manner thus effecting direct coupling between the control lever 55 and control plate 57. When the locking rod 91 is depressed to move into a reverse region of control, a portion of that locking rod extends downwardly to prevent left-right movement of the ball 95 in the socket 97 which socket is, of course, attached to the vehicle frame. Depression of the locking rod 91 also unlocks the differential gear arrangement so that when the control rod 55 is twisted in one left-right direction the shaft 99 will revolve in the opposite direction since it is now coupled to the gear 101 by way of the other two gears of the differential arrangement.

Thus, while the present invention has been described with respect to specific preferred embodiments, numerous modifications will suggest themselves to those of ordinary skill in the art. For example, other schemes may be devised to effect the mirror image left-right control in either the forward or reverse control range and numerous features of any embodiment disclosed herein may be substituted in other embodiments disclosed herein. Other schemes for providing a 3rd degree of mechanical freedom to the control lever of FIGS. 6 and 7 may be devised in addition to allowing a portion of the lever to be depressed to reverse the control direction in a part of the possible control lever positions. These and numerous other modifications will suggest themselves to those of ordinary skill in the art and accordingly the scope of the present invention is to be measured only by that of the appended claims.

I claim:

1. In a hydraulically powered utility vehicle having at least first and second hydraulic motors permanently connected to drive laterally separated ground engaging locomotion producing means, a primary energy source, pump means coupled to the primary energy source and to the hydraulic motors, and control means for controlling the rate and direction of hydraulic flow from the pump means individually through the hydraulic motors, a mechanism for providing single lever operator control for both speed and direction comprising:

- a control lever supported on the vehicle and exhibiting at least 2 degrees of mechanical freedom in response to operator actuation;
- first and second hydraulic control arms for individual ones of said motors, associated with said control means and movable in a continuous manner between full ahead and full reverse positions;
- a control plate pivotably supported on the vehicle for 2 degrees of mechanical freedom;
- means coupling the control lever to the control plate;
- means coupling the first and second arms to distinct points on the control plate, each point being distinct from the point of coupling of the control lever; and
- the control lever having 3 degrees of mechanical freedom, the third degree being a twisting movement, and further comprising a cable coupled to the control lever and to the primary energy source for controlling the primary energy source.

2. The mechanism of claim 1 wherein the means coupling the first and second arms to the control plate comprise a pair of axially movable cables.

3. The mechanism of claim 1 wherein the means coupling the first and second arms to the control plate comprise a pair of mechanical linkages each including a universal joint.

4. The mechanism of claim 1 further comprising spring biasing means for returning the control lever to a neutral position where neither motor receives hydraulic energization.

5. In a hydraulically powered utility vehicle having at least first and second hydraulic motors permanently connected to drive laterally separated ground engaging locomotion producing means, a primary energy source, pump means coupled to the primary energy source and to the hydraulic motors, and control means for controlling the rate and direction of hydraulic flow from the pump means individually through the hydraulic motors, a mechanism for providing single lever operator control for both speed and direction comprising:

- a control lever supported on the vehicle and exhibiting at least 2 degrees of mechanical freedom in response to operator actuation;
- first and second hydraulic control arms for individual ones of said motors, associated with said control means and movable in a continuous manner between full ahead and full reverse positions;
- a control plate pivotably supported on the vehicle for 2 degrees of mechanical freedom;
- means coupling the control lever to the control plate; and
- the control lever having 3 degrees of mechanical freedom, the third degree of freedom allowing at least a portion of the lever to be depressed to reverse control direction throughout a part only of the possible control lever positions, the means coupling the control lever to the control plate comprising a selectively engageable differential gear arrangement for reversing the control direction.

6. The mechanism of claim 5 wherein the means coupling the first and second arms to the control plate comprise a pair of axially movable cables.

7. The mechanism of claim 5 wherein the means coupling the first and second arms to the control plate comprise a pair of mechanical linkages each including a universal joint.

8. The mechanism of claim 5 further comprising spring biasing means for returning the control lever to a neutral position where neither motor receives hydraulic energization.

9. In a hydraulically powered utility vehicle having at least first and second hydraulic motors permanently connected to drive laterally separated ground engaging locomotion producing means, a primary energy source, pump means coupled to the primary energy source and to the hydraulic motors, and control means for controlling the rate and direction of hydraulic flow from the pump means individually through the hydraulic motors, a mechanism for providing single lever operator control for both speed and direction comprising:

- a control lever supported on the vehicle and exhibiting at least 2 degrees of mechanical freedom in response to operator actuation;
- first and second hydraulic control arms for individual ones of said motors, associated with said control means and movable in a continuous manner between full ahead and full reverse positions;
- a control plate pivotably supported on the vehicle for 2 degrees of mechanical freedom;
- means coupling the control lever to the control plate;
- means coupling the first and second arms to distinct points on the control plate, each point being distinct from the point of coupling of the control lever; and
- the means coupling the control lever to the control plate comprises a selectively engageable differential gear arrangement for reversing the control direction.

* * * * *